(12) United States Patent
Zhang et al.

(10) Patent No.: US 11,385,813 B2
(45) Date of Patent: Jul. 12, 2022

(54) METHOD, DEVICE, AND COMPUTER PROGRAM PRODUCT FOR MANAGING STRIPE IN STORAGE SYSTEM

(71) Applicant: EMC IP Holding Company LLC, Hopkinton, MA (US)

(72) Inventors: Xiaobo Zhang, Beijing (CN); Sihang Xia, Beijing (CN); Shaoqin Gong, Beijing (CN); Baote Zhuo, Beijing (CN); Geng Han, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/020,016

(22) Filed: Sep. 14, 2020

(65) Prior Publication Data
US 2021/0286533 A1    Sep. 16, 2021

(30) Foreign Application Priority Data
Mar. 13, 2020    (CN) .......................... 202010176189.5

(51) Int. Cl.
*G06F 3/06* (2006.01)

(52) U.S. Cl.
CPC .......... *G06F 3/0631* (2013.01); *G06F 3/0604* (2013.01); *G06F 3/0689* (2013.01); *G06F 3/064* (2013.01); *G06F 3/0607* (2013.01); *G06F 3/0632* (2013.01); *G06F 3/0644* (2013.01); *G06F 3/0647* (2013.01)

(58) Field of Classification Search
CPC .... G06F 3/0631; G06F 3/0689; G06F 3/0604; G06F 3/0607; G06F 3/0632; G06F 3/0644; G06F 3/0647; G06F 3/064
See application file for complete search history.

(56) References Cited

U.S. PATENT DOCUMENTS

| 8,706,962 | B2* | 4/2014 | Belluomini ........... G06F 3/0631 711/117 |
| 9,804,939 | B1 | 10/2017 | Bono et al. |
| 9,965,201 | B1 | 5/2018 | Bono et al. |
| 10,235,082 | B1 | 3/2019 | Gao et al. |
| 10,481,802 | B1 | 11/2019 | Gao et al. |
| 10,592,165 | B1 | 3/2020 | Han et al. |
| 10,852,951 | B1 | 12/2020 | Dong et al. |
| 10,860,476 | B2 | 12/2020 | Xu et al. |
| 10,976,967 | B2 | 4/2021 | Kang et al. |

(Continued)

*Primary Examiner* — Masud K Khan
(74) *Attorney, Agent, or Firm* — BainwoodHuang

(57) ABSTRACT

Techniques involve: determining, according to a received request for creating a stripe in a storage system, a type of the stripe; acquiring a first workload distribution corresponding to the determined type, wherein the first workload distribution describes the distribution, among a first number of storage devices, of multiple extents in a set of stripes of this type in the storage system; selecting a set of extents from the first number of storage devices based on the first workload distribution, so that the distribution, among the first number of storage devices, of the selected set of extents and the multiple extents in the set of stripes of this type satisfies a preset distribution condition associated with the type; and using the selected set of extents to create the requested stripe based on a stripe creation rule associated with the type. The stripes can be managed in a more effective manner.

20 Claims, 10 Drawing Sheets

(56) References Cited

U.S. PATENT DOCUMENTS

| | | | |
|---|---|---|---|
| 11,048,416 B2 | 6/2021 | Liu et al. | |
| 11,099,734 B2 | 8/2021 | Ma et al. | |
| 11,210,022 B2 | 12/2021 | Ma et al. | |
| 2011/0107317 A1* | 5/2011 | Nolterieke | G06F 8/65 717/168 |
| 2014/0025990 A1* | 1/2014 | Akutsu | G06F 3/0619 714/6.22 |
| 2019/0220212 A1* | 7/2019 | Xu | G06F 3/0616 |
| 2020/0272356 A1* | 8/2020 | Zhang | G06F 3/061 |

* cited by examiner

METHOD, DEVICE, AND COMPUTER PROGRAM PRODUCT FOR MANAGING STRIPE IN STORAGE SYSTEM

CROSS-REFERENCE TO RELATED APPLICATION

This application claims priority to Chinese Patent Application No. CN202010176189.5, on file at the China National Intellectual Property Administration (CNIPA), having a filing date of Mar. 13, 2020, and having "METHOD, DEVICE, AND COMPUTER PROGRAM PRODUCT FOR MANAGING STRIPE IN STORAGE SYSTEM" as a title, the contents and teachings of which are herein incorporated by reference in their entirety.

TECHNICAL FIELD

Implementations of the present disclosure relate to storage management and, in particular, to a method, a device, and a computer program product for managing multiple storage devices in a storage system.

BACKGROUND

With the development of data storage technologies, various data storage devices have already been able to provide users with increasingly high data storage capabilities, and the speed of data access has also been greatly improved. While data storage capabilities are improved, users also have an increasingly high demand for data reliability and the response time of storage systems. Currently, a variety of data storage systems based on Redundant Array of Independent Disks (RAID) have been developed to improve data reliability. When one or more disks in a storage system malfunction, data on the malfunctioning disks can be reconstructed from data on other normally operating disks.

At present, a kind of mapped redundant array of independent disk (Mapped RAID) has already been developed. In this mapped RAID, a disk is a logical concept and can include multiple extents. The multiple extents included in one logical disk can be distributed on different physical storage devices in a resource pool. For multiple extents in a stripe of the mapped RAID, the multiple extents should be distributed on different physical storage devices so that when a physical storage device on which one of the multiple extents is located malfunctions, a reconstruction operation can be performed to restore data from physical storage devices where other extents are located.

It will be understood that multiple types of data may be involved in a user storage system. For example, some stripes of the user storage system may store user data from users, while some stripes may store related data for managing the storage system, such as metadata of the user data. It will be understood that multiple storage devices in the resource pool may have different capacities, and the storage configurations required for different types of data are also different. At this moment, how to construct a user storage system and allocate a required storage space to the user storage system to store the user data and the metadata separately has become a technical problem.

SUMMARY OF THE INVENTION

Therefore, it is desirable to develop and implement a technical solution for managing multiple storage devices in a storage system in a more effective manner. It is expected that this technical solution can be compatible with existing storage systems, and can manage the existing storage systems in a more effective manner by transforming various configurations of the storage systems.

According to a first aspect of the present disclosure, a method for managing stripes in a storage system is provided, the storage system including a first number of storage devices. This method includes: determining, according to a received request for creating a stripe in the storage system, a type of the stripe; acquiring a first workload distribution corresponding to the determined type, wherein the first workload distribution describes the distribution, among the first number of storage devices, of multiple extents in a set of stripes of this type in the storage system; selecting a set of extents from the first number of storage devices based on the first workload distribution, so that the distribution, among the first number of storage devices, of the selected set of extents and the multiple extents in the set of stripes of this type satisfies a preset distribution condition associated with the type; and using the selected set of extents to create the requested stripe based on a stripe creation rule associated with the type.

According to a second aspect of the present disclosure, an electronic device is provided, including: at least one processor; and a memory coupled to the at least one processor, wherein the memory has instructions stored therein, and the instructions, when executed by the at least one processor, cause the device to perform an action for managing stripes in a storage system. The storage system includes a first number of storage devices, and this action includes: determining, according to a received request for creating a stripe in the storage system, a type of the stripe; acquiring a first workload distribution corresponding to the determined type, wherein the first workload distribution describes the distribution, among the first number of storage devices, of multiple extents in a set of stripes of this type in the storage system; selecting a set of extents from the first number of storage devices based on the first workload distribution, so that the distribution, among the first number of storage devices, of the selected set of extents and the multiple extents in the set of stripes of this type satisfies a preset distribution condition associated with the type; and using the selected set of extents to create the requested stripe based on a stripe creation rule associated with the type.

According to a third aspect of the present disclosure, a computer program product is provided, the computer program product being tangibly stored on a non-transitory computer-readable medium and including machine-executable instructions which are used to implement the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example but not limitation. In the accompanying drawings.

DETAILED DESCRIPTION

Figure 1A:
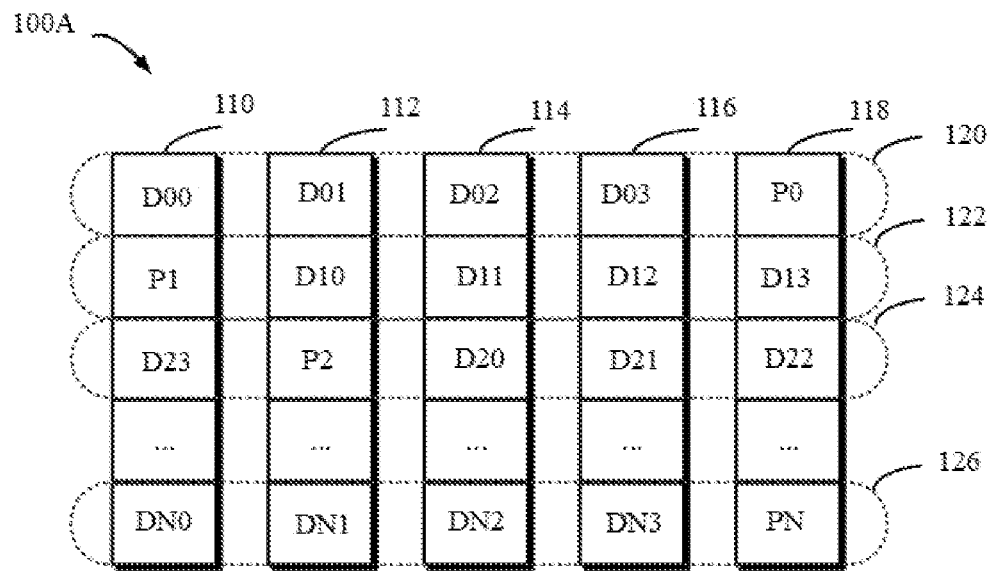
FIGS. 1A and 1B each schematically illustrate a block diagram of a storage system in which implementations of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred implementations of the present disclosure will be described in more detail with reference to the accompanying drawings. Although the preferred implementations of the present disclosure are shown in the accompanying drawings, it should be understood that the present disclosure can be implemented in various forms and should not be limited by the implementations set forth herein. Rather, these implementations are provided so that the present disclosure will be more thorough and complete, and the scope of the present disclosure will be fully conveyed to those skilled in the art.

As used herein, the term "include" and variations thereof mean open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one additional implementation." The terms "first," "second," etc. may refer to different or identical objects. Other explicit and implicit definitions may be included below.

In the context of the present disclosure, a storage system may be a RAID-based storage system. The RAID-based storage system can combine multiple storage devices into one single disk array. By providing redundant storage devices, the reliability of an entire disk group can greatly exceed that of a single storage device. RAID can provide various advantages over a single storage device, such as enhanced data integrity, enhanced fault tolerance functions, increased throughput or capacity, and so on. There are multiple standards for RAID, such as RAID-1, RAID-2, RAID-3, RAID-4, RAID-5, RAID-6, RAID-10, RAID-50, and so on. For more details of RAID levels, those skilled in the art can refer to, for example, https://en.wikipedia.org/wiki/Standard_RAID_levels, http://en.wikipedia.org/wiki/Nested_RAID_levels, and so on.

FIG. 1A schematically illustrates a schematic diagram of storage system 100A in which a method of the present disclosure can be implemented. In the storage system shown in FIG. 1A, a RAID-5 (4D+1P, wherein 4D indicates that the storage system includes four storage devices for storing data, and 1P indicates that the storage system includes one storage device for storing a P-check) array including five independent storage devices (110, 112, 114, 116, and 118) is used as an example to illustrate the working principle of RAID. It should be noted that although five storage devices are schematically shown in FIG. 1A, more or fewer storage devices may be included in other implementations according to different levels of the RAID. Although stripes 120, 122, 124, . . . , and 126 are shown in FIG. 1A, a RAID system may further include a different number of stripes in other examples.

In a RAID, a stripe can span multiple physical storage devices (e.g., stripe 120 spans storage devices 110, 112, 114, 116, and 118). A stripe can be simply understood as a storage region that satisfies a certain address range among multiple storage devices. Data stored in stripe 120 include multiple sections: data block D00 stored on storage device 110, data block D01 stored on storage device 112, data block D02 stored on storage device 114, data block D03 stored on storage device 116, and data block PO stored on storage device 118. In this example, data blocks D00, D01, D02, and D03 are stored data, while data block PO is a P-check for the stored data.

The way of storing data in other strips 122 and 124 is also similar to that in stripe 120, except that checks on other data blocks may be stored on a storage device different from storage device 118. In this way, when one of multiple storage devices 110, 112, 114, 116, and 118 malfunctions, data in the malfunctioning device can be restored from other normal storage devices.

Figure 1B:
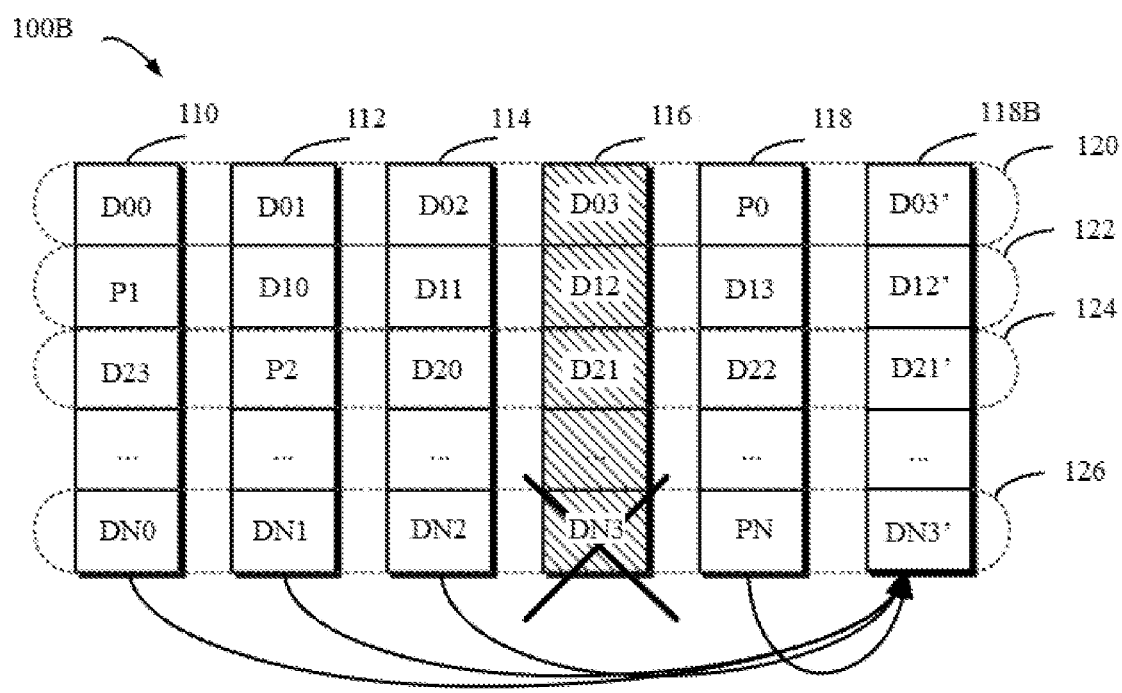

FIG. 1B schematically illustrates schematic diagram 100B of a reconstruction process of storage system 110A. As shown in FIG. 1B, when one storage device (for example, storage device 116 shown by shadow) malfunctions, data can be restored from remaining multiple storage devices 110, 112, 114, and 118 that are normally operating. At this moment, a new backup storage device 118B can be added to the RAID to replace storage device 118, and in this way, the restored data can be written to 118B and the system can be reconstructed.

It should be noted that although a RAID-5 storage system including 5 storage devices (wherein 4 storage devices are used for storing data and 1 storage device is used for storing a check) is described above with reference to FIGS. 1A and 1B, according to the definitions of other RAID levels, there may also be storage systems including other numbers of storage devices. For example, based on the definition of a RAID-6, two storage devices can be used to store checks P and Q, respectively. For another example, based on the definition of a triple-check RAID, three storage devices can be used to store checks P, Q, and R, respectively.

Figure 2:
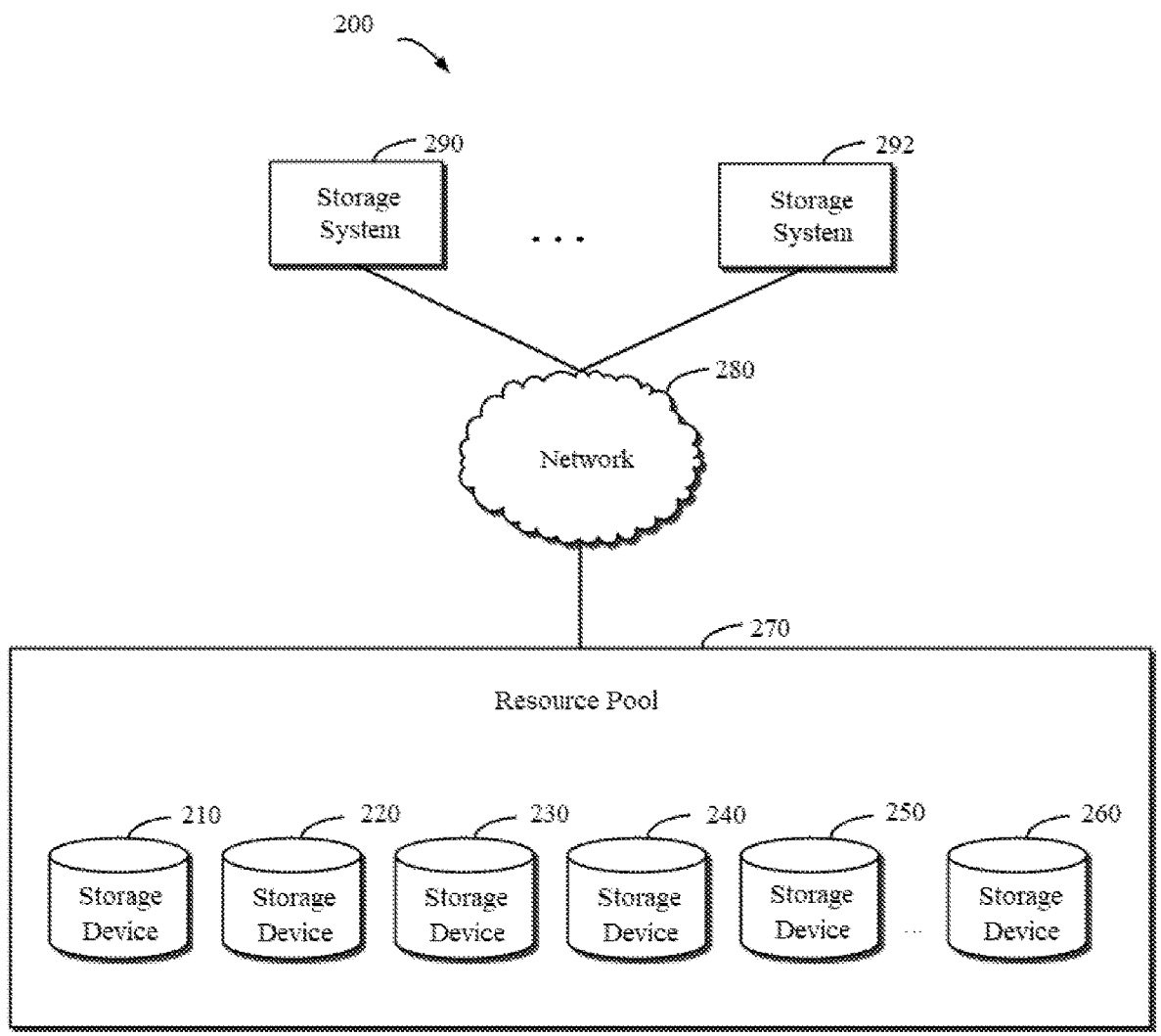
FIG. 2 schematically illustrates a block diagram of an example environment in which the implementations of the present disclosure can be implemented.

With the development of distributed storage technologies, each of storage devices 110, 112, 114, 116, and 118 in the storage system shown in FIGS. 1A and 1B may no longer be limited to a physical storage device, but may be a virtual storage device. For example, each extent on storage device 110 may come from a different physical storage device (hereinafter simply referred to as a storage device) in a resource pool. FIG. 2 schematically illustrates a block diagram of an example environment in which a method of the present disclosure can be implemented. As shown in FIG. 2, storage resource pool 270 may include multiple physical storage devices 210, 220, 230, 240, 250, . . . , and 260. At this moment, storage space in the multiple storage devices can be allocated to multiple user storage systems 290, . . . , and 292. At this moment, user storage systems 290, . . . , and 292 can access storage spaces in various storage devices in storage resource pool 270 through network 280.

Figure 3:
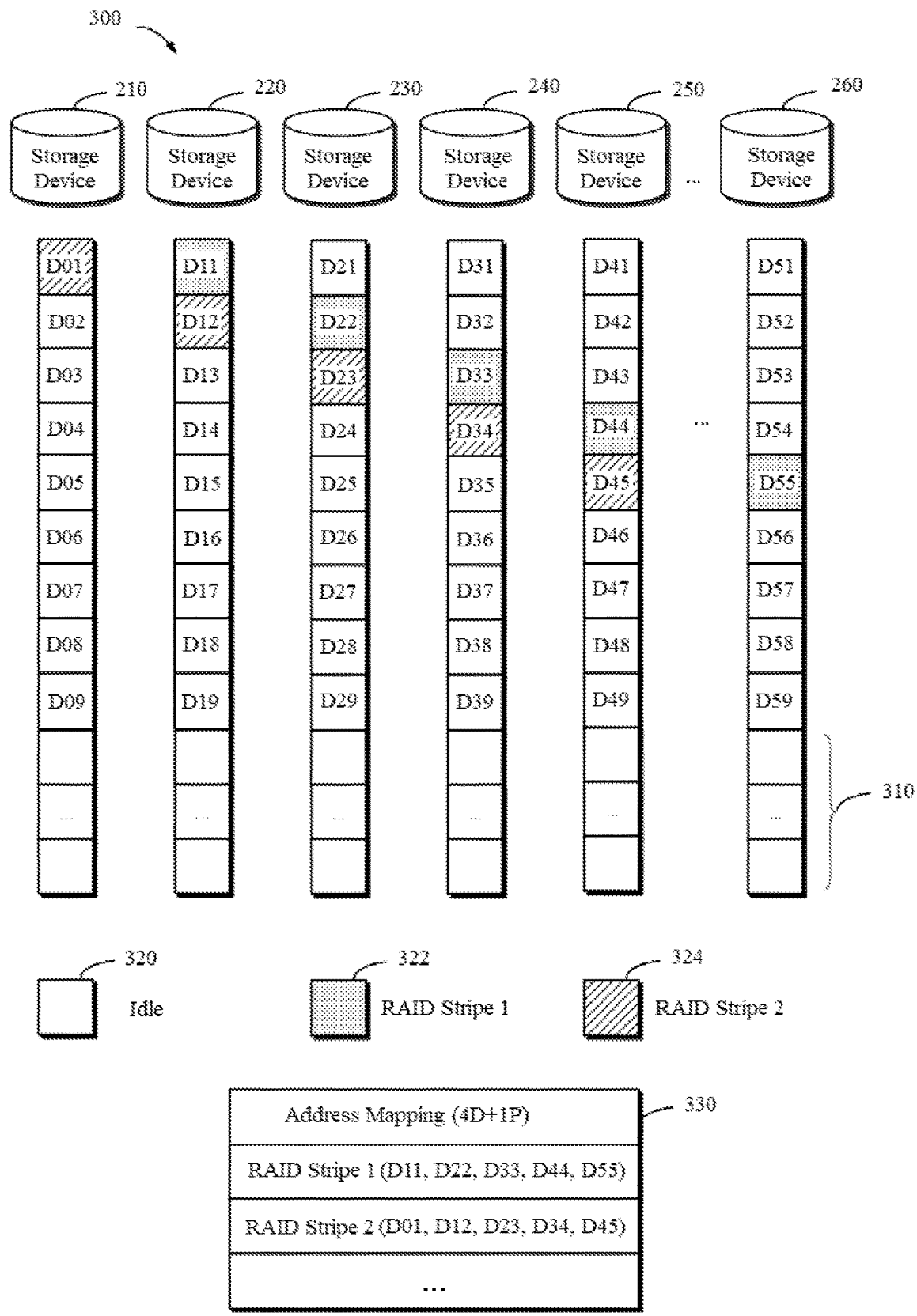
FIG. 3 schematically illustrates a diagram of a storage resource pool in FIG. 2.

FIG. 3 schematically illustrates a diagram of more information about storage resource pool 270 as shown in FIG. 2. Resource pool 270 may include multiple storage devices 210, 220, 230, 240, 250, . . . , and 260. Each storage device may include multiple extents, where legend 320 indicates an idle extent, legend 322 indicates an extent for RAID stripe 1 of storage system 110A in FIG. 1, and legend 324 indicates an extent for RAID 2 of storage system 110A in FIG. 1. At this moment, extents D11, D22, D33, and D44 for RAID stripe 1 are used to store data blocks of this stripe respectively, and extent D55 is used to store checks for the data. Extents D01, D12, D23, and D34 for RAID stripe 2 are used to store data blocks of the second stripe respectively, and extent D45 is used to store checks for the data.

As shown in FIG. 3, address mapping 330 shows an association relation between a stripe and addresses of extents in the stripe. For example, RAID stripe 1 can include 5 extents: D11, D22, D33, D44, and D55. These 5 extents are located in storage devices 210, 220, 230, 240, and 250, respectively. Particularly, as shown in FIG. 3, extent D11 is the first extent in storage device 220, and extent D22 is the second extent in storage device 230. As shown in FIG. 3, idle portion 310 may also be reserved in each storage device, so that when a storage device in the resource pool malfunctions, an extent in idle portion 310 in each storage device may be selected to reconstruct each extent in the malfunctioning storage device.

It should be noted that only a 4D+1P RAID-5 storage system is used as an example in FIG. 3 to illustrate how extents in each stripe are distributed among multiple storage systems of the resource pool. When using other RAID levels, those skilled in the art can implement specific details based on the above principles. For example, in a 6D+1P+1Q RAID-6 storage system, 8 extents in each stripe can be distributed among multiple storage devices, thereby ensuring workload balancing among the multiple storage devices.

Figure 4:
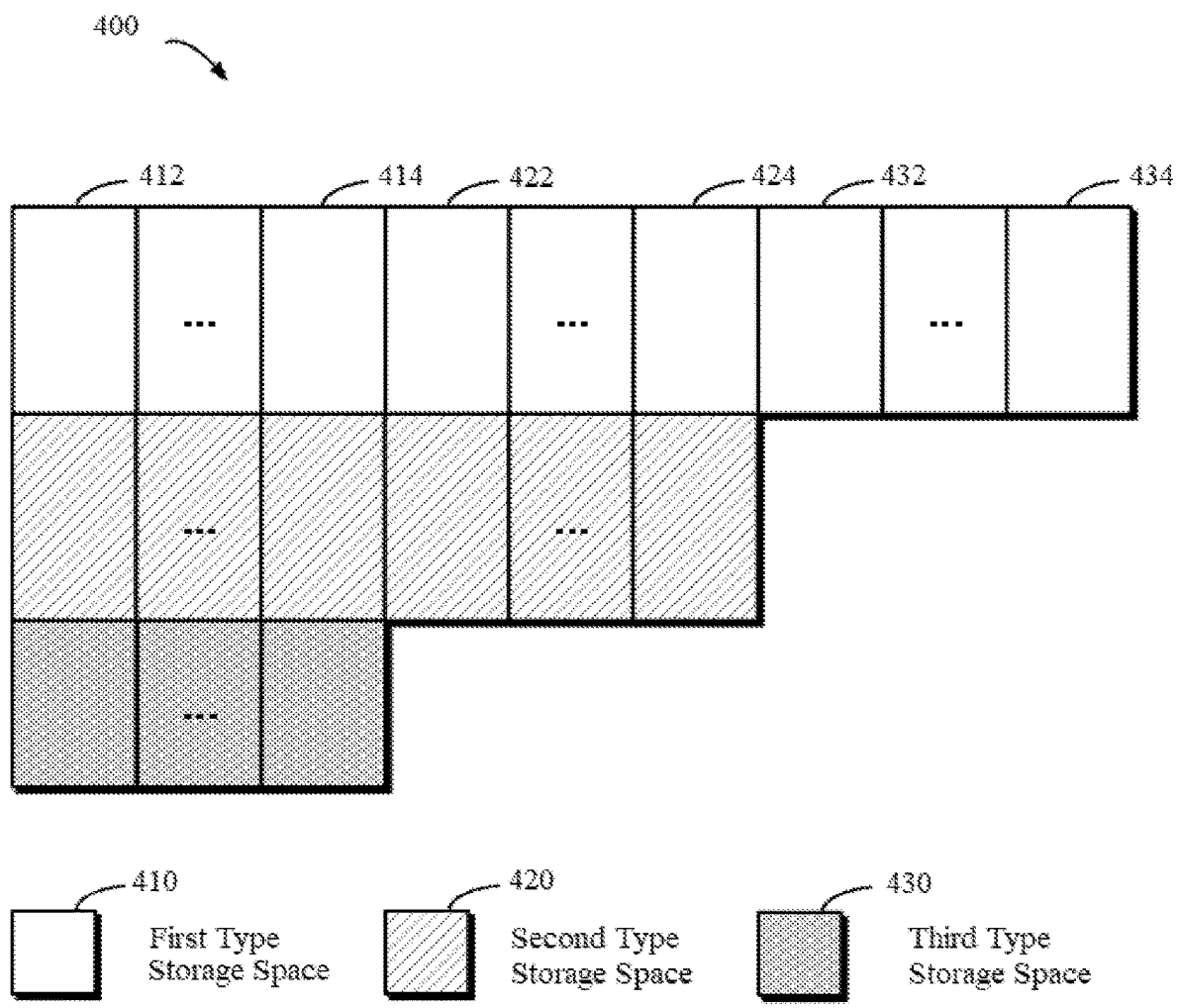
FIG. 4 schematically illustrates a block diagram of a storage system in which the implementations of the present disclosure can be implemented.

Generally speaking, the capacities of storage devices in a storage system are not the same; instead, there can be differences. FIG. 4 schematically illustrates block diagram 400 of a storage system in which the implementations of the present disclosure can be implemented. As shown in FIG. 4, the storage system includes storage devices with 3 types of capacities. Storage devices 412, . . . , and 414 have a larger capacity, storage devices 422, . . . , and 424 have a medium capacity, and storage devices 432, . . . , and 434 have a smaller capacity. At this moment, when stripes in a user storage system are created in different manners, the created storage system will have different capacities.

For example, assuming that extents are selected from multiple storage devices based on a smaller capacity, then at this moment, as shown by a blank area, the first type storage space 410 may span all types of storage devices. Although the multiple storage devices of various types can be managed in a simple manner at this moment, some spaces (e.g., the parts shown with legends 420 and 430) of storage devices 422, . . . , and 424 with the medium capacity and storage devices 412, . . . , and 414 with the larger capacity will be wasted.

At present, a technical solution for managing stripes in a storage system based on an adjacent matrix has been proposed. However, existing technical solutions can neither fully utilize the space in multiple storage devices, nor ensure the workload balancing of data in the stripes among the multiple storage devices. To address the above-mentioned shortcomings, the implementations of the present disclosure provide a method, a device, and a computer program product for managing stripes in a storage system. Specific implementations of the present disclosure will be described in detail below.

According to an example implementation of the present disclosure, a technical solution is proposed to manage stripes in a storage system based on the type of a stripe that is expected to be created. It will be understood that the storage system may include two types of stripes: user-data type and metadata type, wherein the user data here indicates that user data from a user of the storage system will be stored in the stripe. For example, for safety reasons, user data can be stored in a 4D+1P manner or other manners. The metadata indicates that metadata of the user data will be stored in the stripe. It will be understood that the metadata may include attribute information about the user data, such as type, owner, creation time, and so on. It is desirable to store the metadata in a safer and more reliable manner. For example, the metadata may be stored based on a 1D+1D+1D manner. At this moment, 3 identical copies of the metadata will exist in order to provide greater safety and reliability.

It will be understood that due to the different types, the storage manners used and the ways to create a stripe are different. With an example implementation of the present disclosure, by managing stripes in a storage system based on types of the stripes, the storage system can be managed in a more convenient and effective manner, thereby increasing the usage of storage devices in the storage system and ensuring workload balancing among the storage devices.

Figure 5:
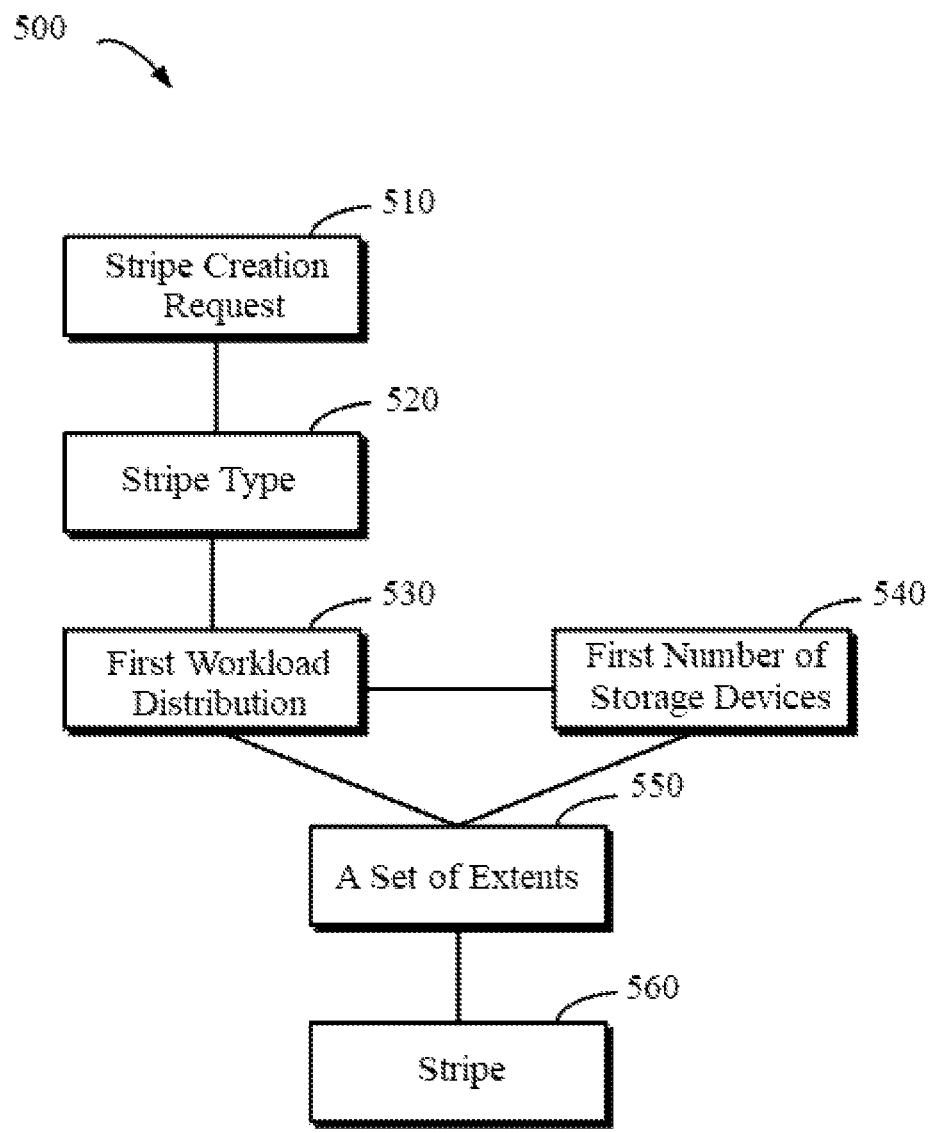
FIG. 5 schematically illustrates a block diagram of an architecture for managing stripes in a storage system according to one implementation of the present disclosure.

FIG. 5 schematically illustrates block diagram 500 of an architecture for managing stripes in a storage system according to one implementation of the present disclosure. In the example of FIG. 5, the storage system may include a first number of storage devices 540. Stripe type 520 (e.g., user-data type or metadata type) of a stripe that is expected to be created may be determined based on stripe creation request 510. Then, first workload distribution 530 associated with stripe type 520 may be determined, and a set of extents 550 may be selected from the first number of storage devices 540 based on first workload distribution 530 for use in creating stripe 560. It will be understood that the number of the set of extents 550 here is associated with stripe type 520: when the stripe type is user data, the set of extents 550 may include 4D+1P extents (i.e., 5 extents); and when the stripe type is metadata, the set of extents 550 may include 1D+1D+1D extents (i.e., 3 extents).

Figure 6:
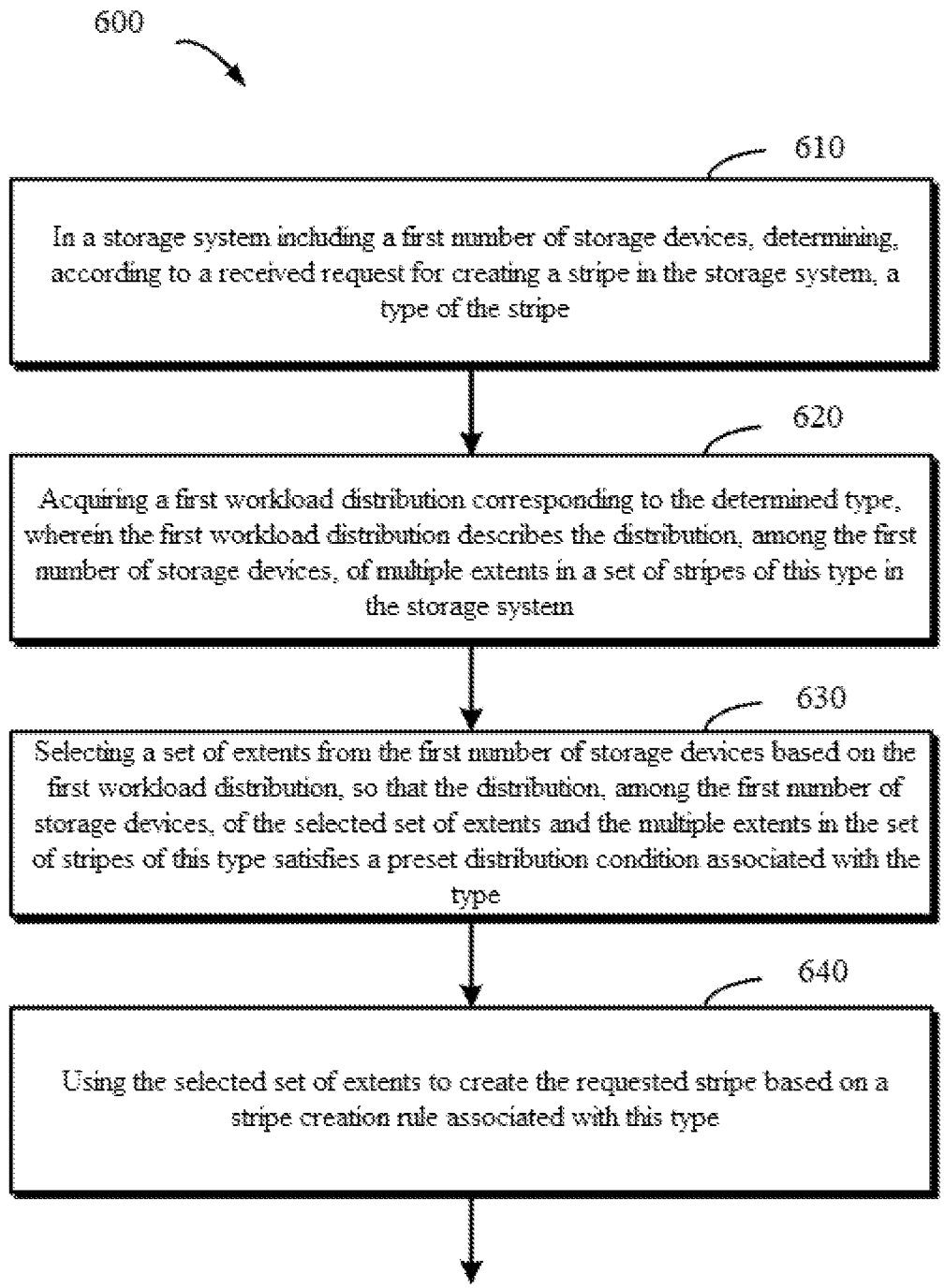
FIG. 6 schematically illustrates a block diagram of a method for managing stripes in a storage system according to one implementation of the present disclosure.

Hereinafter, more details of the example implementation of the present disclosure will be described with reference to FIG. 6. FIG. 6 schematically illustrates a block diagram of method 600 for managing stripes in a storage system according to one implementation of the present disclosure. At block 610, in a storage system that includes a first number of storage devices, according to a received request for creating a stripe in the storage system, a type of the stripe can be determined. According to the example implementation of the present disclosure, a type of a stripe that is expected to be created can be determined based on the definition of the request for creating the stripe.

At block 620, first workload distribution 530 corresponding to the determined type can be acquired. Here, first workload distribution 530 describes the distribution, among the first number of storage devices, of multiple extents in a set of stripes of this type in the storage system. It will be understood that first workload distribution 530 will change with the process of creating stripes. Hereinafter, the condition of an initial stage of the operation of the storage system will be described first with reference to FIG. 7.

Figure 7:
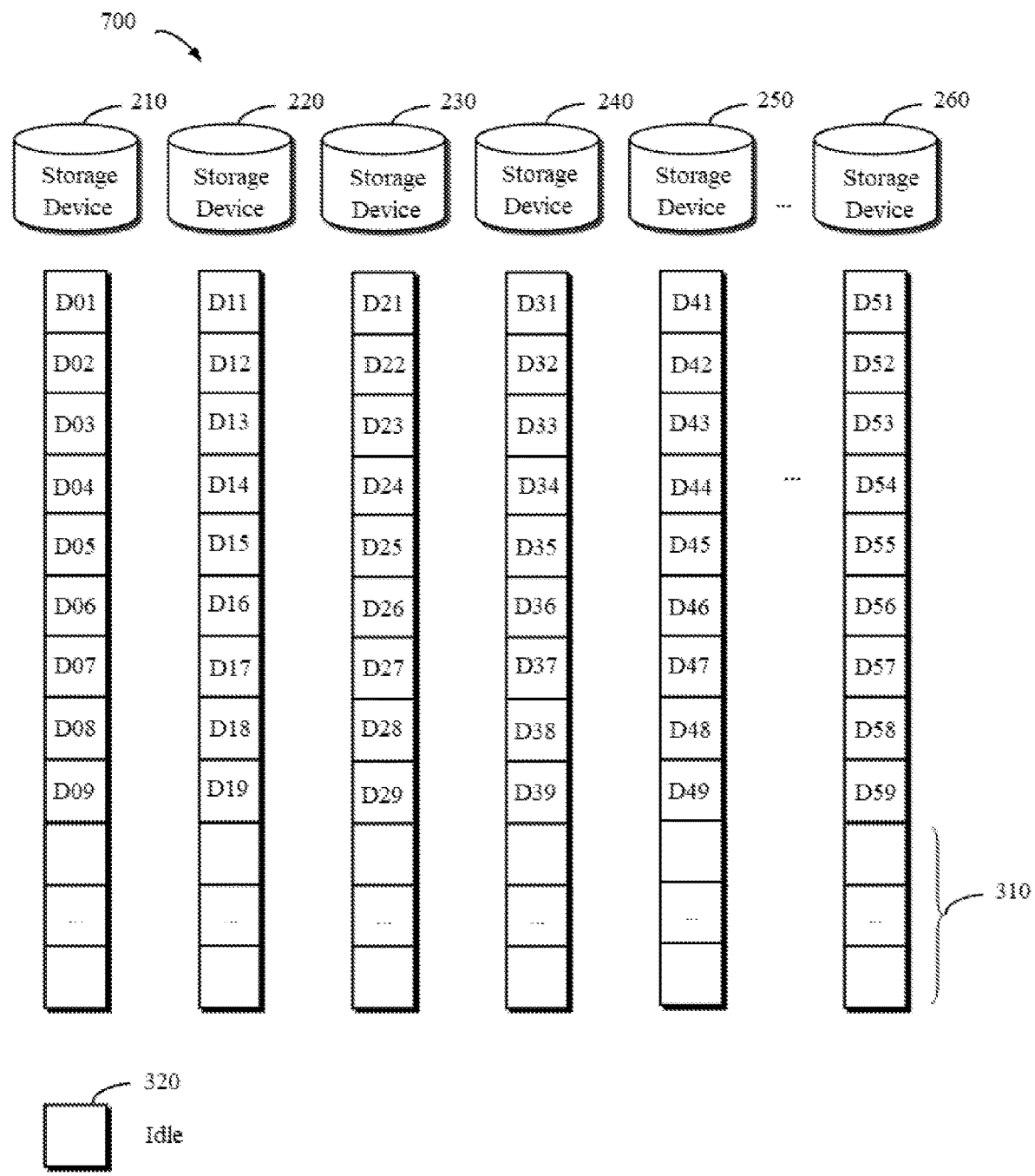
FIG. 7 schematically illustrates a block diagram of states of storage devices in a storage system at an initial stage according to an implementation of the present disclosure.

FIG. 7 schematically illustrates block diagram 700 of states of storage devices in a storage system at an initial stage according to an implementation of the present disclosure. As shown in FIG. 7, assuming that all storage devices in resource pool 270 are allocated to the storage system, then at this moment, the storage system includes a first number of storage devices 210, 220, 230, 240, 250, . . . , and 260. At the initial stage of the operation of the storage system, the storage system does not include any stripes, but the extents in all storage devices are in an idle state and are unallocated. At this moment, first workload distribution 530 may be created based on the first number (represented by an integer n). Particularly, as shown in Table 1 below, an n×n-dimensional matrix may be used to represent first workload distribution 530. For convenience of description, only an example of the method of the present disclosure will be described by taking n=8 as an example.

TABLE 1

Example of Workload Distribution of Stripes of User-Data Type

| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

In the matrix shown in Table 1, the value at the intersection of row i and column j indicates whether there is an association relation between the i-th storage device and the j-th storage device in the first number of storage devices, that is, whether the two storage devices are used to construct the same stripe, where 0 means that there is no association relation, and non-zero means that there is an association relation. At the initial stage of the operation of the storage system, since the storage system does not include any stripes, all data in the matrix are 0, which means that there are no stripes of the user-data type in the first number of storage devices.

Return to block 630 of FIG. 6, a set of extents can be selected from the first number of storage devices based on first workload distribution 530, so that the distribution, among the first number of storage devices, of the selected set of extents and the multiple extents in the set of stripes of this type satisfies a preset distribution condition associated with the type. It will be understood that, since it is desired to allocate a storage space from each storage device in the storage system as uniform as possible, each of the extents allocated in the storage system may be allocated as evenly as possible among the first number of storage devices.

Figure 8:
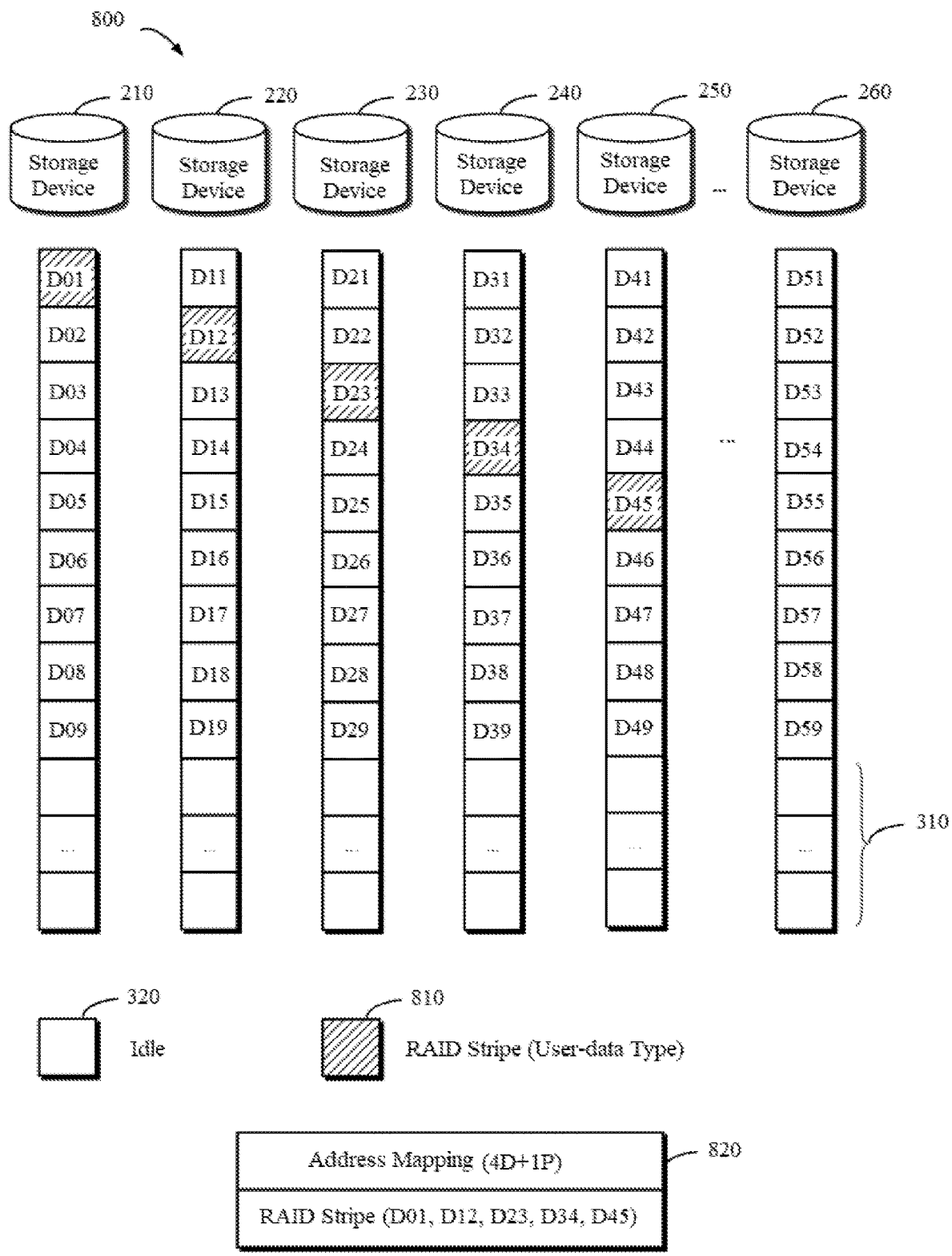
FIG. 8 schematically illustrates a block diagram of states of storage devices in a storage system including one stripe of a user-data type according to an implementation of the present disclosure.

It will be understood that since no extents in the storage system are allocated for creating stripes at the initial stage, a set of extents can be arbitrarily selected from the first number of storage devices (in this example, the set of extents includes 5 extents). Hereinafter, it will be described in detail with reference to FIG. 8. FIG. 8 schematically illustrates block diagram 800 of states of storage devices in a storage system including one stripe of the user-data type according to an implementation of the present disclosure. For example, 5 extents D01, D12, D23, D34, and D45 as shown in legend 810 in FIG. 8 may be selected.

Return to block 640 of FIG. 6, the selected set of extents may be used to create the requested stripe based on a stripe creation rule associated with this type. Since the stripe type is the user-data type at this moment and the corresponding creation rule is 4D+1P, the RAID stripe can be created based on extents D01, D12, D23, D34, and D45. The address of each extent used to create the stripe can be written into address mapping 820. For example, D01, D12, D23, and D34 can be used to store user data, and extent D45 can be used to store the checks for each extent.

It will be understood that since the number of stripes in the storage system has changed at this moment, the workload distribution as shown in Table 1 above should be updated. Particularly, a set of storage devices in which the selected set of extents are located can be determined respectively. In the example of FIG. 8, the selected extents are located in storage devices 210 to 250 (i.e., the 0th to 4th storage devices), so the first workload distribution can be updated based on the determined set of storage devices. The above storage devices 210 to 250 have an association relation, and the first workload distribution shown in Table 1 will be updated to be as shown in Table 2 below.

TABLE 2

Example of Workload Distribution of Stripes of User-Data Type

| 4 | 4 | 4 | 4 | 4 | 0 | 0 | 0 |
| 4 | 4 | 4 | 4 | 4 | 0 | 0 | 0 |
| 4 | 4 | 4 | 4 | 4 | 0 | 0 | 0 |
| 4 | 4 | 4 | 4 | 4 | 0 | 0 | 0 |
| 4 | 4 | 4 | 4 | 4 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

As shown in Table 2, since the extents in the 0th to 4th storage devices are used to create the stripe, at this moment, the 0th storage device is respectively associated with the 1st to 4th storage devices, the 1st storage device is respectively associated with the 0th and the 2nd to 4th storage devices, the 2nd storage device is respectively associated with the 0th to 1st and the 3rd to 4th storage devices, and so on. The elements in the matrix that are relevant to the 0th to 4th storage devices can be set to 4 (here, 4 represents the number of valid data extents in one stripe). It will be understood that, since the association relation is bidirectional, the above matrix is a symmetric matrix, and the elements located in rows 0 to 4 and columns 0 to 4 in the matrix are all set to 4.

According to an example implementation of the present disclosure, the number of valid storage extents involved in a given storage device in the first number of storage devices can be determined based on the first workload distribution, which can be implemented based on the following equation 1.

$$\text{Number}(i) = \frac{\sum_{i=0}^{n-1} NW(i, j)}{\text{raid\_width}} \quad \text{Equation 1}$$

In equation 1, Number indicates the number of valid storage extents in the i-th storage device, n indicates the number of storage devices in the storage system, raid width indicates the width for a stripe of a given type, and i and j are integers from 0 to n−1. Based on the matrix shown in Table 2, the width of the stripe is 4+1=5. It can be determined that the number of valid storage extents included in the 0th storage device is (4+4+4+4+4)/5=4, that is, this storage device includes 4 valid storage extents. Similarly, the number of valid storage extents in other storage devices can also be determined. With an example implementation of the present disclosure, the number of valid storage extents included in each storage device can be determined in a convenient and fast manner.

With an example implementation of the present disclosure, the first workload distribution may represent the degree of the workload of each of the first number of storage devices being used. Therefore, in the subsequent process of creating stripes, a storage device with the lightest workload may be selected based on the first workload distribution, so that the use of storage spaces in the first number of storage devices tends to be balanced as much as possible.

It will be understood that the method of determining the first workload distribution when the storage system includes one stripe is schematically shown above only with reference to FIG. 8 and Table 2. Based on the principles described above, new stripes can be continuously created and the first workload distribution can be updated accordingly. When the storage system includes multiple stripes, the matrix of the first workload distribution may be determined in a similar manner.

If a request to create another stripe of the user-data type is received, another extent can also be selected based on the matrix shown in Table 2. Since the 5th to 7th storage devices have not been used, one extent can be selected from the 5th to 7th storage devices, respectively. Since the workloads of the 0th to 4th extents are the same, one idle extent can be selected from any 2 of the above 5 storage devices, respectively. For example, one idle extent may be selected from each of the 0th to 1st storage devices, respectively. Then, the matrix shown in Table 2 can be updated in a similar manner based on the storage device where the currently selected extent is located.

It will be understood that the above only schematically illustrates an example of the workload distribution in the case where each storage device in the storage system has the same capacity. When each storage device has a different capacity, the workload distribution can also be updated based on the capacity of each storage device. Particularly, the corresponding storage capacity of the corresponding storage device in the first number of storage devices may be determined first, and the first workload distribution can be updated based on the corresponding storage capacity and the selected set of storage devices.

Assume that the storage system includes storage devices each having one of two capacities of 10G and 5G, wherein the 0th to 3rd storage devices have a capacity of 10G and the 4th to 7th storage devices have a capacity of 5G. The values in the matrix can also be normalized based on the proportional relation of the capacities of the storage devices. It will be understood that, in order to ensure that the usage rates of the storage spaces in the first number of storage devices are kept as similar as possible, the storage space in a storage device with a higher capacity should be allocated preferentially. Since the storage space of the 0th to 3rd storage devices is larger than that of the 4th to 7th storage devices, an extent can be preferentially selected from the 0th to 3rd storage devices.

According to the example implementation of the present disclosure, a corresponding workload of a corresponding storage device can be determined based on the relation between the corresponding storage capacity and the maximum storage capacity of the first number of storage devices. For example, a normalization operation can be performed using the maximum storage capacity (i.e., 10G). For the 0th to 3rd storage devices, the elements in the matrix can be kept unchanged. For the 4th to 7th storage devices, since the storage capacity of these storage devices is only half of the maximum storage capacity (5G/10G=½), if extents are selected from all storage devices at the same frequency, the available space in the 4th to 7th storage devices will be exhausted before the 0th to 3rd storage devices. At this moment, based on the ratio of the maximum capacity to the capacity of each storage device, the elements in the matrix that correspond to the 4th to 7th storage devices can be set to twice the original value in order to indicate that the percentage of the used portion in these storage devices is high (that is, the workload is high).

With the example implementation of the present disclosure, the elements in the matrix that correspond to the storage devices with smaller storage spaces are given a larger value, so each element in the matrix can clearly indicate the actual usage workload of the storage device corresponding to that element. In this way, the next time when an extent is selected for creating a stripe, an idle extent can be selected preferentially from a storage device having a smaller usage workload. Alternatively and/or additionally, the elements in the matrix that correspond to the 0th to 3rd storage devices can also be set to ½ of the original value in order to indicate that the percentage of the used portion of these storage devices is low (that is, the workload is low).

The specific operations that are performed when the stripe type is user data have been described above with reference to FIG. 8. Hereinafter, the description will be given on how to determine the first workload distribution when the stripe type is metadata. According to an example implementation of the present disclosure, it is possible to set respective workload distributions for the stripes of the user-data type and the stripes of the metadata type, respectively. In other words, it is possible to establish respective matrices for the stripes of the user-data type and of the metadata type, in order to describe the workload distribution of stripes of each type. Since the storage system does not include stripes of the metadata type at the initial stage, the workload distribution for the metadata type at this moment is as shown in Table 1 above.

Figure 9:
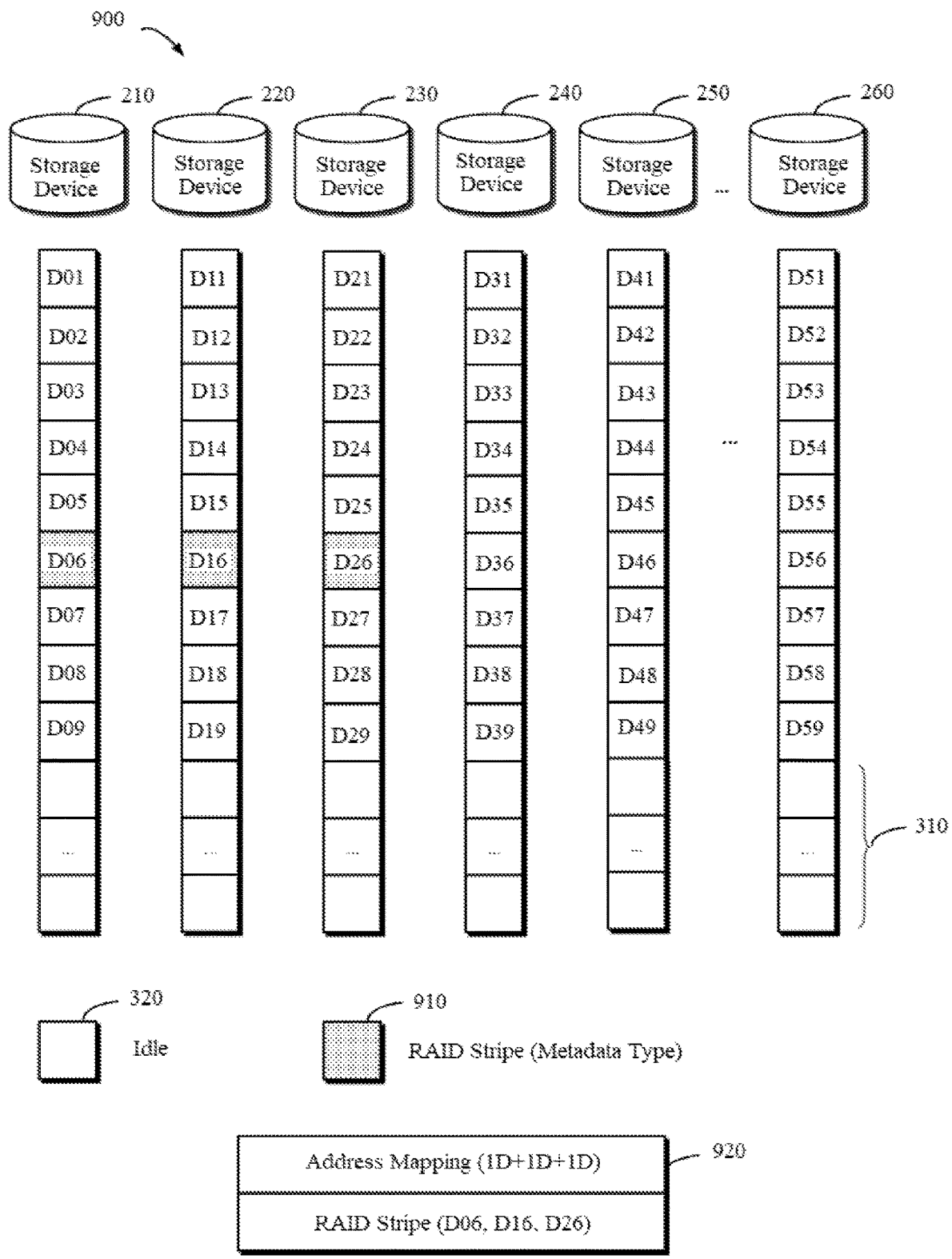
FIG. 9 schematically illustrates a block diagram of states of storage devices in a storage system including one stripe of a metadata type according to an implementation of the present disclosure.

When a request to create a stripe of the metadata type is received, a set of 3 extents can be selected from the 0th to 7th storage devices in a similar manner. FIG. 9 schematically illustrates block diagram 900 of states of storage devices in a storage system including one stripe of the metadata type according to an implementation of the present disclosure. For example, 3 extents D06, D16, and D26 as shown in legend 910 in FIG. 9 may be selected. It will be understood that the size of the extents herein is for illustration only, and in the storage system, the size of an extent used to store metadata may be much smaller than that of an extent used to store user data.

Return to block 640 of FIG. 6, the description will be given on how to create a stripe of the metadata type. The requested stripe can be created using a selected set of extents based on a stripe creation rule associated with this type. Since the stripe type is the metadata type at this moment and the corresponding creation rule is 1D+1D+1D, the RAID stripe can be created based on extents D06, D16, and D26. The address of each extent used to create the stripe can be written into address mapping 920. At this moment, the 3 extents each hold 3 copies of the metadata.

It will be understood that since the number of stripes of the metadata type in the storage system has changed at this moment, the workload distribution as shown in Table 1 above should be updated. Particularly, a set of storage devices in which the selected set of extents are located can be determined respectively. In the example of FIG. 9, the selected extents are located in storage devices 210 to 220 (i.e., the 0th to 2nd storage devices), respectively, so the first workload distribution can be updated based on the determined set of storage devices. At this moment, the workload distribution for the metadata type will be updated to be as shown in Table 3 below.

TABLE 3

Example of Workload Distribution of Stripes of Metadata Type

| 1 | 1 | 1 | 0 | 0 | 0 | 0 | 0 |
|---|---|---|---|---|---|---|---|
| 1 | 1 | 1 | 0 | 0 | 0 | 0 | 0 |
| 1 | 1 | 1 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

As shown in Table 3, since the extents in the 0th to 2nd storage devices are used to create the stripe, at this moment, the 0th storage device is respectively associated with the 1st to 2nd storage devices, the 1st storage device is respectively associated with the 0th and the 2nd storage devices, and the 2nd storage device is respectively associated with the 0th to 1st storage devices. The elements in the matrix that are relevant to the 0th to 2nd storage devices can be set to 1 (here, 1 represents the number of valid data extents in one stripe of the metadata type).

The number of extents included in a certain storage device that are used for stripes of the metadata type can be determined based on the above Equation 1. Based on the matrix shown in Table 3, the width of the stripe is 1+1+1=3. For example, it can be determined that the number of valid storage extents included in the 0th storage device is (1+1+1)/3=1, that is, this storage device includes 1 valid storage extent.

It will be understood that, since the size of metadata is small, the size of extents in the stripe used to store the metadata is set to a small value. Allocating a stripe of the metadata type from the storage system does not take up too much storage space, so the preset distribution condition corresponding to the metadata type may include a polling condition. When another request to create a stripe of the metadata type is received, another set of extents may be selected from the first number of storage devices based on a polling rule. Particularly, according to the first workload distribution, a set of storage devices are selected from the first number of storage devices according to the polling condition, and then a set of extents are selected from the selected set of storage devices, respectively. For example, it is possible to select one extent from each of the 3rd to 5th storage devices respectively to create the stripe. Further, the elements in Table 3 above which are associated with the 3rd to 5th storage devices may be updated to form an updated workload distribution as shown in Table 4 below.

TABLE 4

Example of Workload Distribution of Stripes of Metadata Type

| 1 | 1 | 1 | 0 | 0 | 0 | 0 | 0 |
|---|---|---|---|---|---|---|---|
| 1 | 1 | 1 | 0 | 0 | 0 | 0 | 0 |
| 1 | 1 | 1 | 0 | 0 | 0 | 0 | 0 |
| 0 | 0 | 0 | 1 | 1 | 1 | 0 | 0 |
| 0 | 0 | 0 | 1 | 1 | 1 | 0 | 0 |
| 0 | 0 | 0 | 1 | 1 | 1 | 0 | 0 |
| 0 | 0 | 0 | 0 | 0 | 0 | 0 | 0 |
| 0 | 0 | 0 | 0 | 0 | 0 | 0 | 0 |

With an example implementation of the present disclosure, a corresponding number and size of extents can be selected from the storage system based on the requirements of each stripe type. Further, respective workload distributions are set for stripes of different types, respectively, and values in the workload distribution can be updated according to the requirements of each type, so that the extents in stripes of each type are evenly distributed among multiple storage devices. In addition, workload balancing among the multiple storage devices can be ensured, and storage spaces in the multiple storage devices can be used up at similar points in time.

The specific method of how to create a stripe based on the stripe type has been described above. Hereinafter, the description will be given on how to migrate data in a storage system when the number of storage devices in the storage system changes. According to an example implementation of the present disclosure, if the number of storage devices in a storage system is changed from a first number to a second number, in order to ensure workload balancing of data of each stripe among the second number of storage devices, it is necessary to perform data migration.

Particularly, a second workload distribution corresponding to the determined type can be acquired, wherein the second workload distribution describes the distribution, among the second number of storage devices, of multiple extents in a set of stripes of this type in the storage system; and at least a portion of the extents in the set of stripes are migrated based on the second workload distribution. With the example implementation of the present disclosure, it can be ensured that the extents in the already created stripes in the storage system are evenly distributed among the second number of storage devices.

When a storage device is to be removed from the storage system (i.e., the second number is less than the first number), data can be migrated from the extents in the storage device that is to be removed to the storage device that is not to be removed. Particularly, available extents in a storage device with a low workload can be selected as the destination according to the workload distribution.

When a storage device is to be added to the storage system (i.e., the second number is greater than the first number), at least a portion of the extents in a set of stripes may be migrated. Particularly, the number of extents to be migrated can be determined based on the first workload distribution and the second workload distribution, and then extents can be selected from the first number of storage devices based on the number of extents to be migrated. Hereinafter, a migration operation for the user-data type will be described first. When the number of storage devices in the storage system is changed from n to m (n<m), the second workload distribution may be represented with an m×m matrix. At this moment, the m×m matrix describes the distribution of multiple extents of a set of stripes of the user-data type in the storage system among the m storage devices. Since n<m, at this moment, only the n×n portion at the upper left corner of the m×m matrix has non-zero values, while the other portions are all 0.

Processing may be performed for each of the first number of storage devices. For a given storage device in the first number of storage devices, source extents to be migrated can be determined in the first number of storage devices based on the storage capacities of the set of stripes of this type and storage capacities of the second number of storage devices. Assume that the number of storage devices in the storage system is changed from 8 to 16, and these 16 storage devices have equal storage capacities. It can be determined that the original capacity of the storage system is ½ of the new capacity. At this moment, 50% (i.e., ½) of the already allocated multiple extents of the user-data type in the storage system can be migrated to the newly added storage devices.

Furthermore, destination extents can be selected from the second number of storage devices based on the second workload distribution in order to migrate data in the source extents to the destination extents. It will be understood that since the second workload distribution describes the usage workload of all storage devices in the storage system, the destination extents may be selected from the storage devices with low usage workloads. Continue with the above example, assume that the newly added 8 storage devices are denoted as the 8th to 15th storage devices. At this moment, the workloads of the 8th to 15th storage devices are all 0, and extents can be selected from any one of these storage devices. 50% of the multiple extents in the 1st storage device which are allocated for the user-data stripe can be migrated to the 8th storage device. Similarly, 50% of the multiple extents in the 2nd storage device which are allocated for the user-data stripe can be migrated to any of the 9th to 15th storage devices, and so on.

It will be understood that the above describes the case where each of the storage devices in the storage system has the same capacity by way of example only. According to the example implementation of the present disclosure, the storage devices may each have a different capacity. At this moment, the number of extents to be migrated can be determined in the given storage device based on a relation between a given storage capacity of the given storage device and an extreme storage capacity of the storage devices.

According to the example implementation of the present disclosure, assume that the 0th to 7th storage devices each have a capacity of 10G, and the newly added 8 storage device each have a capacity of 20G. At this moment, more extents can be migrated to the newly added storage devices. Since the capacity of a newly added storage device is twice that of an original storage device, ⅔ (1−1/(1+2)) of the extents in one original storage device can be migrated to one newly added storage device. According to the example implementation of the present disclosure, the newly added multiple storage devices may each have a different capacity, and the original multiple storage devices may also each have a different capacity. At this moment, a normalization operation can be performed based on a proportional relation between storage capacities of the devices, so as to determine the number of extents to be migrated.

Hereinafter, a migration operation related to the metadata type will be described. When the stripe type is metadata, the migration can be performed in a similar manner. Since metadata is small in size, it is not necessary to consider the storage capacities of the storage devices during the migration process. Instead, the number of extents to be migrated in each storage device can be determined directly based on a proportional relation between the first number and the second number. The destination extents can be selected from the newly added storage devices based on a polling rule such that the multiple migrated extents in a stripe of the metadata type can be evenly distributed among the second number of storage devices.

Examples of the method according to the present disclosure have been described in detail above with reference to FIGS. 2 to 9, and implementations of a corresponding means (e.g., specialized circuitry, equipment, etc.) will be described below. According to the example implementation of the present disclosure, a means for managing stripes in a storage system is provided. The storage system includes a first number of storage devices, and this means includes: a determining module which is configured to determine, according to a received request for creating a stripe in the storage system, a type of the stripe; an acquiring module which is configured to acquire a first workload distribution corresponding to the determined type, wherein the first workload distribution describes the distribution, among the first number of storage devices, of multiple extents in a set of stripes of this type in the storage system; a selecting module which is configured to select a set of extents from the first number of storage devices based on the first workload distribution, so that the distribution, among the first number of storage devices, of the selected set of extents and the multiple extents in the set of stripes of this type satisfies a preset distribution condition associated with the type; and a creating module which is configured to use the selected set of extents to create the requested stripe based on a stripe creation rule associated with the type. According to the example implementation of the present disclosure, the means further includes modules for performing method 600 described above.

Figure 10:
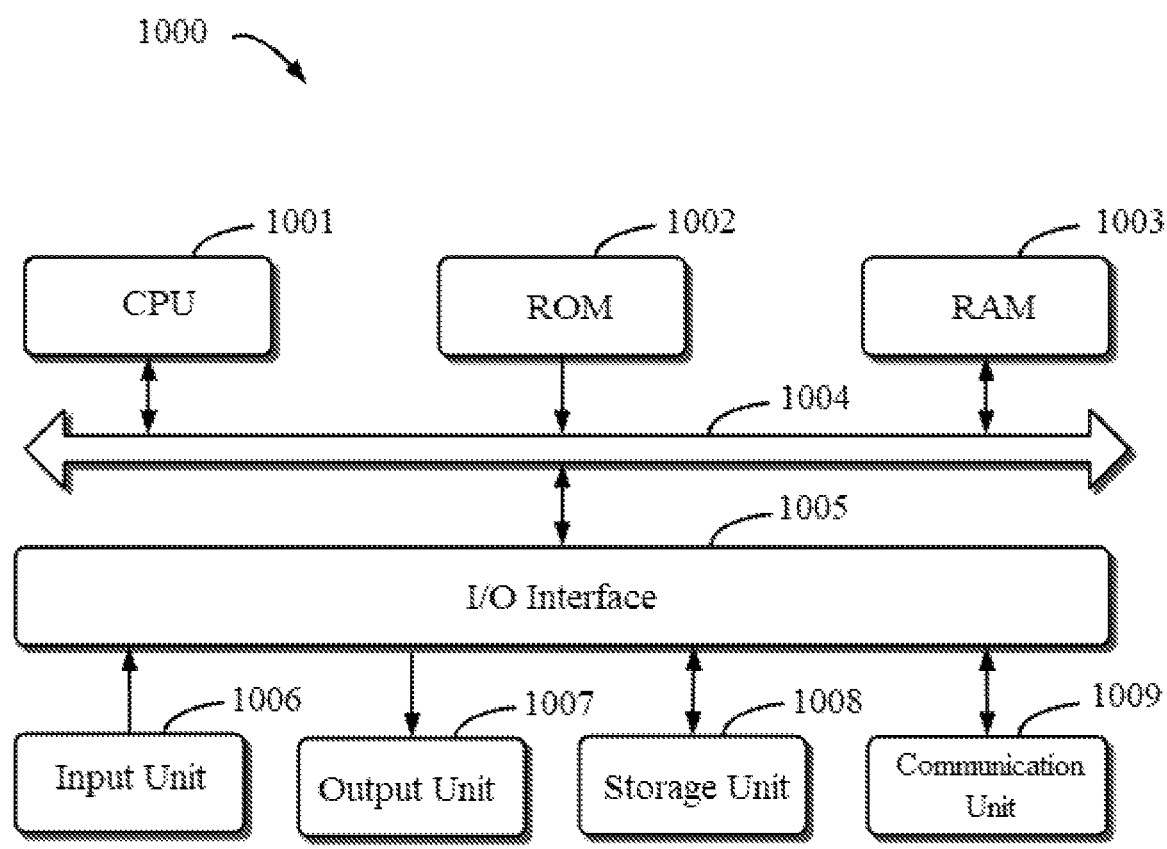
FIG. 10 schematically illustrates a block diagram of a device for managing stripes in a storage system according to an example implementation of the present disclosure.

FIG. 10 schematically illustrates a block diagram of device 1000 for managing stripes in a storage system according to an example implementation of the present disclosure. As shown, device 1000 includes central processing unit (CPU) 1001 which can perform various appropriate actions and processes according to computer program instructions stored in read only memory (ROM) 1002 or computer program instructions loaded from storage unit 1008 into random access memory (RAM) 1003. In RAM 1003, various programs and data required for the operation of device 1000 can also be stored. CPU 1001, ROM 1002, and RAM 1003 are connected to each other through bus 1004. Input/output (I/O) interface 1005 is also connected to bus 1004.

Multiple components in device 1000 are connected to I/O interface 1005, including: input unit 1006, such as a keyboard and a mouse; output unit 1007, such as various types of displays and speakers; storage unit 1008, such as a magnetic disk and an optical disk; and communication unit 1009, such as a network card, a modem, and a wireless communication transceiver. Communication unit 1009 allows device 1000 to exchange information/data with other devices through a computer network such as the Internet and/or various telecommunication networks.

The various processes and processing described above, for example, method 600, can be performed by processing unit 1001. For example, in some implementations, method 600 may be implemented as a computer software program that is tangibly included on a machine-readable medium, for example, storage unit 1008. In some implementations, part or all of the computer program may be loaded and/or installed on device 1000 via ROM 1002 and/or communication unit 1009. When a computer program is loaded into RAM 1003 and executed by CPU 1001, one or more steps of method 600 described above may be performed. Alternatively, in other implementations, CPU 1001 may also be configured in any other suitable manner in order to implement the above process/method.

According to an example implementation of the present disclosure, an electronic device is provided, including: at least one processor; and a memory coupled to the at least one processor, wherein the memory has instructions stored therein, and the instructions, when executed by the at least one processor, cause the device to perform an action for managing stripes in a storage system that includes a first number of storage devices. This action includes: determining, according to a received request for creating a stripe in the storage system, a type of the stripe; acquiring a first workload distribution corresponding to the determined type, wherein the first workload distribution describes the distribution, among the first number of storage devices, of multiple extents in a set of stripes of this type in the storage system; selecting a set of extents from the first number of storage devices based on the first workload distribution, so that the distribution, among the first number of storage devices, of the selected set of extents and the multiple extents in the set of stripes of this type satisfies a preset distribution condition associated with the type; and using the selected set of extents to create the requested stripe based on a stripe creation rule associated with the type.

According to an example implementation of the present disclosure, acquiring a first workload distribution corresponding to the determined type includes: according to a determination that the storage system does not include a stripe of this type, creating the first workload distribution according to the first number, wherein the first workload distribution indicates that there is no stripe of this type in the first number of storage devices.

According to an example implementation of the present disclosure, this action further includes: determining a set of storage devices in which the selected set of extents are located, respectively; and updating the first workload distribution based on the determined set of storage devices.

According to an example implementation of the present disclosure, the type of the stripe includes user data which indicates that user data from a user of the storage system will be stored in the stripe; and updating the first workload distribution based on the determined set of storage devices includes: determining corresponding storage capacities of corresponding storage devices in the first number of storage devices; and updating the first workload distribution based on the corresponding storage capacities and the selected set of storage devices.

According to an example implementation of the present disclosure, updating the first workload distribution based on the corresponding storage capacities and the selected set of storage devices includes: determining corresponding workloads of the corresponding storage devices based on a relation between the corresponding storage capacities and a maximum storage capacity of the first number of storage devices; and updating the first workload distribution based on the determined corresponding workloads.

According to an example implementation of the present disclosure, this action further includes: according to a determination that the number of the storage devices in the storage system is changed from the first number to the second number, acquiring a second workload distribution corresponding to the determined type, wherein the second workload distribution describes the distribution, among the second number of storage devices, of multiple extents in a set of stripes of this type in the storage system; and migrating at least a portion of the extents in the set of stripes based on the second workload distribution.

According to an example implementation of the present disclosure, migrating at least a portion of the extents in the set of stripes based on the second workload distribution includes: for a given storage device in the first number of storage devices, determining source extents to be migrated in the first number of storage devices based on the storage capacities of the first number of storage devices and storage capacities of the second number of storage devices; selecting destination extents from the second number of storage devices based on the second workload distribution; and migrating data in the source extents to the destination extents.

According to an example implementation of the present disclosure, the type of the stripe includes user data, and determining source extents to be migrated in the first number of storage devices further includes: determining the number of extents to be migrated in the given storage device based on a relation between a given storage capacity of the given storage device and an extreme storage capacity of the first number of storage devices; and selecting the source extents based on the determined number.

According to an example implementation of the present disclosure, the type of the stripe includes metadata which indicates that metadata of user data will be stored in the stripe, and the preset distribution condition includes a polling condition; and selecting a set of extents from the first number of storage devices based on the first workload distribution includes: according to the first workload distribution, selecting the set of storage devices from the first number of storage devices in accordance with the polling condition; and selecting the set of extents respectively from the selected set of storage devices.

According to an example implementation of the present disclosure, this action further includes: determining the number of valid storage extents involved in a given storage device in the first number of storage devices based on the first workload distribution.

According to an example implementation of the present disclosure, a computer program product is provided, the computer program product being tangibly stored on a non-transitory computer-readable medium and including machine-executable instructions which are used to implement the method according to the present disclosure.

According to an example implementation of the present disclosure, a computer-readable medium is provided, the computer-readable medium storing machine-executable instructions that, when executed by at least one processor, cause the at least one processor to implement the method according to the present disclosure.

The present disclosure can be a method, a device, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a protruding structure in a groove with instructions stored thereon, and any suitable combination of the foregoing. Computer-readable storage media used herein are not to be interpreted as transient signals per se, such as radio waves or other freely propagated electromagnetic waves, electromagnetic waves propagated through waveguides or other transmission media (for example, light pulses through fiber-optic cables), or electrical signals transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. Computer-readable program instructions may be executed entirely on a user's computer, executed partly on a user's computer, executed as a separate software package, executed partly on a user's computer and partly on a remote computer, or executed entirely on a remote computer or a server. In the case where a remote computer is involved, the remote computer can be connected to a user's computer through any kind of networks, including a local area network (LAN) or a wide area network (WAN), or it can be connected to an external computer (for example, connected through the Internet using an Internet service provider). In some implementations, an electronic circuit, for example, a programmable logic circuit, a field programmable gate array (FPGA), or a programmable logic array (PLA), is customized by utilizing state information of computer-readable program instructions, and the electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to implementations of the present disclosure. It should be understood that each block of the flowcharts and/or block diagrams and combinations of blocks in the flowcharts and/or block diagrams can be implemented by computer-readable program instructions.

These computer-readable program instructions can be provided to a processing unit of a general-purpose computer, a special-purpose computer, or another programmable data processing apparatus, thereby producing a machine, such that these instructions, when executed by the processing unit of the computer or another programmable data processing apparatus, produces an apparatus for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium storing the instructions includes an article of manufacture that includes instructions for implementing various aspects of the functions/actions specified in one or more blocks in the flowcharts and/or block diagrams.

The computer-readable program instructions can also be loaded onto a computer, another programmable data processing apparatus, or another device, so that a series of operating steps can be performed on the computer, another programmable data processing apparatus, or another device to produce a computer-implemented process, such that the instructions executed on the computer, another programmable data processing apparatus, or another device can implement the functions/actions specified in one or more blocks in the flowcharts and/or block diagrams.

The flowcharts and block diagrams in the accompanying drawings illustrate the architectures, functions, and operations of possible implementations of the systems, methods, and computer program products according to various implementations of the present disclosure. In this regard, each block in the flowcharts or block diagrams may represent a module, a program segment, or a part of an instruction, which contains one or more executable instructions for implementing specified logical functions. In some alternative implementations, the functions marked in the blocks may also occur in an order different from those marked in the accompanying drawings. For example, two consecutive blocks may actually be executed substantially in parallel, and they may sometimes be executed in a reverse order, depending on the functions involved. It should also be noted that each block in the block diagrams and/or flowcharts and combinations of blocks in the block diagrams and/or flowcharts can be implemented by a dedicated hardware-based system that performs specified functions or actions, or can be implemented by a combination of dedicated hardware and computer instructions.

Various implementations of the present disclosure have been described above, and the above description is illustrative and not exhaustive, and is not limited to the disclosed various implementations. Many modifications and variations will be apparent to those skilled in the art without departing from the scope and spirit of the described various implementations. The terms used herein are chosen to best explain the principles and practical applications of the implementations or the technical improvements to technologies in the market, or to enable other persons of ordinary skill in the art to understand the implementations disclosed herein.

The invention claimed is:

1. A method for managing stripes in a storage system which includes a first number of storage devices, the method comprising:
    determining, according to a received request for creating a stripe in the storage system, a type of the stripe;
    acquiring a first workload distribution corresponding to the determined type, wherein the first workload distribution describes the distribution, among the first number of storage devices, of multiple extents in a set of stripes of this type in the storage system;
    selecting a set of extents from the first number of storage devices based on the first workload distribution, so that the distribution, among the first number of storage devices, of the selected set of extents and the multiple extents in the set of stripes of this type satisfies a preset distribution condition associated with the type;
    using the selected set of extents to create the requested stripe based on a stripe creation rule associated with the type; and
    according to a determination that the number of the storage devices in the storage system is changed from the first number to a second number,
        acquiring a second workload distribution corresponding to the determined type, wherein the second workload distribution describes the distribution, among the second number of storage devices, of multiple extents in a set of stripes of this type in the storage system; and
        migrating at least a portion of the extents in the set of stripes based on the second workload distribution.

2. The method according to claim 1, wherein migrating the at least a portion of the extents in the set of stripes based on the second workload distribution includes: for a given storage device in the first number of storage devices,
    determining source extents to be migrated in the first number of storage devices based on storage capacities of the first number of storage devices and storage capacities of the second number of storage devices;
    selecting destination extents from the second number of storage devices based on the second workload distribution; and
    migrating data in the source extents to the destination extents.

3. The method according to claim 2, wherein the type of the stripe includes user data, and determining source extents to be migrated in the first number of storage devices further includes:
    determining the number of extents to be migrated in the given storage device based on a relation between a given storage capacity of the given storage device and an extreme storage capacity of the first number of storage devices; and
    selecting the source extents based on the determined number.

4. The method according to claim 1, wherein the type of the stripe includes metadata which indicates that metadata of user data will be stored in the stripe, and the preset distribution condition includes a polling condition; and selecting a set of extents from the first number of storage devices based on the first workload distribution includes:
    according to the first workload distribution, selecting the set of storage devices from the first number of storage devices in accordance with the polling condition; and
    selecting the set of extents respectively from the selected set of storage devices.

5. The method according to claim 1, further comprising:
    determining the number of valid storage extents involved in a given storage device in the first number of storage devices based on the first workload distribution.

6. A method for managing stripes in a storage system which includes a first number of storage devices, the method comprising:
    determining, according to a received request for creating a stripe in the storage system, a type of the stripe;
    acquiring a first workload distribution corresponding to the determined type, wherein the first workload distribution describes the distribution, among the first number of storage devices, of multiple extents in a set of stripes of this type in the storage system;
    selecting a set of extents from the first number of storage devices based on the first workload distribution, so that the distribution, among the first number of storage devices, of the selected set of extents and the multiple extents in the set of stripes of this type satisfies a preset distribution condition associated with the type; and
    using the selected set of extents to create the requested stripe based on a stripe creation rule associated with the type;
    wherein acquiring the first workload distribution corresponding to the determined type includes: according to a determination that the storage system does not include a stripe of this type,
        creating the first workload distribution according to the first number, wherein the first workload distribution indicates that there is no stripe of this type in the first number of storage devices.

7. The method according to claim 6, further comprising:
    determining a set of storage devices in which the selected set of extents are located, respectively; and
    updating the first workload distribution based on the determined set of storage devices.

8. The method according to claim 7, wherein the type of the stripe includes user data which indicates that user data from a user of the storage system will be stored in the stripe; and updating the first workload distribution based on the determined set of storage devices includes:
    determining corresponding storage capacities of corresponding storage devices in the first number of storage devices; and
    updating the first workload distribution based on the corresponding storage capacities and the selected set of storage devices.

9. The method according to claim 8, wherein updating the first workload distribution based on the corresponding storage capacities and the selected set of storage devices includes:
    determining corresponding workloads of the corresponding storage devices based on a relation between the corresponding storage capacities and a maximum storage capacity of the first number of storage devices; and
    updating the first workload distribution based on the determined corresponding workloads.

10. An electronic device, comprising:
at least one processor; and
a memory coupled to the at least one processor, wherein the memory has instructions stored therein, the instructions, when executed by the at least one processor, cause the device to perform an action for managing stripes in a storage system that includes a first number of storage devices, and the action includes:
   determining, according to a received request for creating a stripe in the storage system, a type of the stripe;
   acquiring a first workload distribution corresponding to the determined type, wherein the first workload distribution describes the distribution, among the first number of storage devices, of multiple extents in a set of stripes of this type in the storage system;
   selecting a set of extents from the first number of storage devices based on the first workload distribution, so that the distribution, among the first number of storage devices, of the selected set of extents and the multiple extents in the set of stripes of this type satisfies a preset distribution condition associated with the type;
   using the selected set of extents to create the requested stripe based on a stripe creation rule associated with the type; and
   according to a determination that the number of the storage devices in the storage system is changed from the first number to a second number,
      acquiring a second workload distribution corresponding to the determined type, wherein the second workload distribution describes the distribution, among the second number of storage devices, of multiple extents in a set of stripes of this type in the storage system; and
      migrating at least a portion of the extents in the set of stripes based on the second workload distribution.

11. The electronic device according to claim 10, wherein migrating the at least a portion of the extents in the set of stripes based on the second workload distribution includes:
for a given storage device in the first number of storage devices,
   determining source extents to be migrated in the first number of storage devices based on storage capacities of the first number of storage devices and storage capacities of the second number of storage devices;
   selecting destination extents from the second number of storage devices based on the second workload distribution; and
migrating data in the source extents to the destination extents.

12. The electronic device according to claim 11, wherein the type of the stripe includes user data, and determining source extents to be migrated in the first number of storage devices further includes:
   determining the number of extents to be migrated in the given storage device based on a relation between a given storage capacity of the given storage device and an extreme storage capacity of the first number of storage devices; and
   selecting the source extents based on the determined number.

13. The electronic device according to claim 10, wherein the type of the stripe includes metadata which indicates that metadata of user data will be stored in the stripe, and the preset distribution condition includes a polling condition; and selecting a set of extents from the first number of storage devices based on the first workload distribution includes:
   according to the first workload distribution, selecting the set of storage devices from the first number of storage devices in accordance with the polling condition; and
   selecting the set of extents respectively from the selected set of storage devices.

14. The electronic device according to claim 10, wherein the action further includes:
   determining the number of valid storage extents involved in a given storage device in the first number of storage devices based on the first workload distribution.

15. An electronic device, comprising:
at least one processor; and
a memory coupled to the at least one processor, wherein the memory has instructions stored therein, the instructions, when executed by the at least one processor, cause the device to perform an action for managing stripes in a storage system that includes a first number of storage devices, and the action includes:
   determining, according to a received request for creating a stripe in the storage system, a type of the stripe;
   acquiring a first workload distribution corresponding to the determined type, wherein the first workload distribution describes the distribution, among the first number of storage devices, of multiple extents in a set of stripes of this type in the storage system;
   selecting a set of extents from the first number of storage devices based on the first workload distribution, so that the distribution, among the first number of storage devices, of the selected set of extents and the multiple extents in the set of stripes of this type satisfies a preset distribution condition associated with the type; and
   using the selected set of extents to create the requested stripe based on a stripe creation rule associated with the type;
wherein acquiring the first workload distribution corresponding to the determined type includes: according to a determination that the storage system does not include a stripe of this type,
   creating the first workload distribution according to the first number, wherein the first workload distribution indicates that there is no stripe of this type in the first number of storage devices.

16. The electronic device according to claim 15, wherein the action further includes:
   determining a set of storage devices in which the selected set of extents are located, respectively; and
   updating the first workload distribution based on the determined set of storage devices.

17. The electronic device according to claim 16, wherein the type of the stripe includes user data which indicates that user data from a user of the storage system will be stored in the stripe; and updating the first workload distribution based on the determined set of storage devices includes:
   determining corresponding storage capacities of corresponding storage devices in the first number of storage devices; and
   updating the first workload distribution based on the corresponding storage capacities and the selected set of storage devices.

18. The electronic device according to claim 17, wherein updating the first workload distribution based on the corresponding storage capacities and the selected set of storage devices includes:

determining corresponding workloads of the corresponding storage devices based on a relation between the corresponding storage capacities and a maximum storage capacity of the first number of storage devices; and updating the first workload distribution based on the determined corresponding workloads.

19. A computer program product having a non-transitory computer readable medium which stores a set of instructions to manage stripes in a storage system which includes a first number of storage devices; the set of instructions, when carried out by computerized circuitry, causing the computerized circuitry to perform a method of:

determining, according to a received request for creating a stripe in the storage system, a type of the stripe;

acquiring a first workload distribution corresponding to the determined type, wherein the first workload distribution describes the distribution, among the first number of storage devices, of multiple extents in a set of stripes of this type in the storage system;

selecting a set of extents from the first number of storage devices based on the first workload distribution, so that the distribution, among the first number of storage devices, of the selected set of extents and the multiple extents in the set of stripes of this type satisfies a preset distribution condition associated with the type;

using the selected set of extents to create the requested stripe based on a stripe creation rule associated with the type; and according to a determination that the number of the storage devices in the storage system is changed from the first number to a second number, acquiring a second workload distribution corresponding to the determined type, wherein the second workload distribution describes the distribution, among the second number of storage devices, of multiple extents in a set of stripes of this type in the storage system; and migrating at least a portion of the extents in the set of stripes based on the second workload distribution.

20. A computer program product having a non-transitory computer readable medium which stores a set of instructions to manage stripes in a storage system which includes a first number of storage devices; the set of instructions, when carried out by computerized circuitry, causing the computerized circuitry to perform a method of:

determining, according to a received request for creating a stripe in the storage system, a type of the stripe;

acquiring a first workload distribution corresponding to the determined type, wherein the first workload distribution describes the distribution, among the first number of storage devices, of multiple extents in a set of stripes of this type in the storage system;

selecting a set of extents from the first number of storage devices based on the first workload distribution, so that the distribution, among the first number of storage devices, of the selected set of extents and the multiple extents in the set of stripes of this type satisfies a preset distribution condition associated with the type; and using the selected set of extents to create the requested stripe based on a stripe creation rule associated with the type;

wherein acquiring the first workload distribution corresponding to the determined type includes: according to a determination that the storage system does not include a stripe of this type, creating the first workload distribution according to the first number, wherein the first workload distribution indicates that there is no stripe of this type in the first number of storage devices.

* * * * *